United States Patent
Miura et al.

(10) Patent No.: US 11,376,627 B2
(45) Date of Patent: Jul. 5, 2022

(54) ULTRASONIC HORN

(71) Applicant: SHINKAWA LTD., Tokyo (JP)

(72) Inventors: Hikaru Miura, Tokyo (JP); Takuya Asami, Tokyo (JP); Yasumoto Togashi, Tokyo (JP); Nobuyuki Aoyagi, Tokyo (JP)

(73) Assignee: SHINKAWA LTD., Tokyo (JP)

( * ) Notice: Subject to any disclaimer, the term of this patent is extended or adjusted under 35 U.S.C. 154(b) by 339 days.

(21) Appl. No.: 15/781,148

(22) PCT Filed: Nov. 22, 2016

(86) PCT No.: PCT/JP2016/084547
§ 371 (c)(1),
(2) Date: Aug. 24, 2018

(87) PCT Pub. No.: WO2017/094558
PCT Pub. Date: Jun. 8, 2017

(65) Prior Publication Data
US 2018/0345318 A1    Dec. 6, 2018

(30) Foreign Application Priority Data
Dec. 4, 2015 (JP) .............................. JP2015-238059

(51) Int. Cl.
*B23K 20/02* (2006.01)
*B06B 1/02* (2006.01)
(Continued)

(52) U.S. Cl.
CPC .............. *B06B 1/0207* (2013.01); *B06B 3/00* (2013.01); *B23K 20/106* (2013.01); *B06B 2201/72* (2013.01); *B23K 20/004* (2013.01)

(58) Field of Classification Search
CPC ...... B23K 20/106; B06B 2201/72; B06B 3/00
See application file for complete search history.

(56) References Cited

U.S. PATENT DOCUMENTS

D558,876 S  *  1/2008  Spetzler ...................... D24/144
8,836,200 B2 *  9/2014  Young ...................... B06B 3/00
                                                             310/323.02
(Continued)

FOREIGN PATENT DOCUMENTS

CN     202240147 U  *  5/2012  ............. B23K 20/10
DE     2944080 A1  *  5/1980  ....... B29C 66/81427
(Continued)

OTHER PUBLICATIONS

"International Search Report (Form PCT/ISA/210) of PCT/JP2016/084547," dated Dec. 20, 2016, with English translation thereof, pp. 1-4.

(Continued)

*Primary Examiner* — Erin B Saad
*Assistant Examiner* — Carlos J Gamino
(74) *Attorney, Agent, or Firm* — JCIPRNET

(57) ABSTRACT

An ultrasonic horn is provided with: a vibration generating unit configured to generate longitudinal vibration having a frequency in the ultrasonic band on the basis of a signal having a frequency in the ultrasonic band input from an oscillator; a vibration amplifying unit configured to amplify the vibration generating unit while transmitting the longitudinal vibration from the vibration generating unit; and a longitudinal-torsional vibration conversion slit unit having slits formed in a groove-like shape on the surfaces of the vibration amplifying unit and configured to convert the longitudinal vibration into torsional vibration. The vibration amplifying unit has a polygonal shape in a plane view, and has a plurality of surfaces provided with slits along with a surface not provided with slits.

2 Claims, 3 Drawing Sheets

(51) Int. Cl.
 *B23K 20/10* (2006.01)
 *B06B 3/00* (2006.01)
 *B23K 20/00* (2006.01)

(56) References Cited

U.S. PATENT DOCUMENTS

| | | | |
|---|---|---|---|
| 2003/0125620 A1* | 7/2003 | Satou | B06B 3/00 |
| | | | 600/437 |
| 2007/0080193 A1* | 4/2007 | Kakutani | H01L 24/85 |
| | | | 228/101 |
| 2008/0023525 A1* | 1/2008 | Maeda | C23C 14/228 |
| | | | 228/18 |
| 2012/0018489 A1 | 1/2012 | Kakutani et al. | |
| 2012/0018490 A1 | 1/2012 | Kakutani et al. | |
| 2012/0018491 A1 | 1/2012 | Kakutani et al. | |
| 2016/0368200 A1* | 12/2016 | Oehm | B06B 1/0207 |
| 2019/0033264 A1* | 1/2019 | Silveira Costa Vieira | G01M 5/0025 |

FOREIGN PATENT DOCUMENTS

| | | | | |
|---|---|---|---|---|
| JP | 06000881 A | * | 1/1994 | ....... B29C 66/81431 |
| JP | H06881 | | 1/1994 | |
| JP | H08294673 | | 11/1996 | |
| JP | 11214451 A | * | 8/1999 | ........... B23K 20/106 |
| JP | 2007129181 | | 5/2007 | |
| JP | 2010149017 | | 7/2010 | |
| JP | 2013111508 | | 6/2013 | |

OTHER PUBLICATIONS

"Office Action of China Counterpart Application", dated May 31, 2019, with English translation thereof, p. 1-p. 13.

* cited by examiner

ULTRASONIC HORN

CROSS-REFERENCE TO RELATED APPLICATION

This application is a 371 application of the International PCT application serial no. PCT/JP2016/084547, filed on Nov. 22, 2016, which claims the priority benefits of Japan application no. 2015-238059, filed on Dec. 4, 2015. The entirety of each of the above-mentioned patent applications is hereby incorporated by reference herein and made a part of this specification.

BACKGROUND OF THE INVENTION

Technical Field

The present invention relates to an ultrasonic horn. The application claims the priority on the basis of Japanese Patent No. 2015-238059 filed in Japan on Dec. 4, 2015, the content of which is incorporated herein.

Related Art

For example, patent literature 1 discloses an ultrasonic complex vibration device, which is provided with a longitudinal-torsional vibration conversion slit unit for converting longitudinal vibration into torsional vibration on a rod periphery. According to such an ultrasonic complex vibration generating device, vibration in a longitudinal direction and vibration in a torsional direction can be generated complexly.

LITERATURE OF RELATED ART

Patent Literature

Patent literature 1: Japanese Laid-open No. 2013-111508

SUMMARY

Problems to be Solved

Incidentally, an ultrasonic complex vibration device is considered to be used as an ultrasonic processing machine by providing a gripper and mounting a head for processing on a front end. In the ultrasonic complex vibration device disclosed in patent literature 1, a longitudinal-torsional vibration conversion slit unit is peripherally arranged on a rod periphery. Therefore, arrangement positions of the gripper and the head for processing are limited by the longitudinal-torsional vibration conversion slit unit, and the gripper and the head for processing are hard to be arranged near the longitudinal-torsional vibration conversion slit unit.

The present invention is accomplished based on the above problems, and provides an ultrasonic horn which makes it easy to arrange the gripper and the head for processing.

Means to Solve the Problems

In order to achieve the above purpose, the ultrasonic horn in one embodiment of the present invention includes: a vibration generating unit configured to generate longitudinal vibration having a frequency in the ultrasonic band on the basis of a signal having a frequency in the ultrasonic band input from an oscillator; a vibration amplifying unit configured to amplify while transmitting the longitudinal vibration from the vibration generating unit; and a longitudinal-torsional vibration conversion slit unit having slits formed in a groove-like shape on the surface of the vibration amplifying unit and configured to convert the longitudinal vibration into torsional vibration. The vibration amplifying unit has a polygonal shape in a plane view, and has a plurality of surfaces provided with slits along with a surface not provided with slits.

The slits may be formed obliquely relative to a transmitting direction of the longitudinal vibration.

The vibration amplifying unit may have a rectangular shape in a plane view, and the slits may be provided on two opposite surfaces of the vibration amplifying unit.

The vibration generating unit may generate longitudinal vibration having a single frequency.

Effect

According to the embodiment of the present invention, the vibration amplifying unit has a polygonal shape in a plane view, and has a plurality of surfaces provided with slits along with a surface not provided with slits. A plurality of surfaces are provided with slits so that longitudinal vibration can be converted into torsional vibration. Besides, on the surface not provided with slits, a gripper and a head for processing can be provided.

DESCRIPTION OF THE EMBODIMENTS

An ultrasonic horn in one embodiment of the present invention is described below with reference to drawings.

Figure 1:
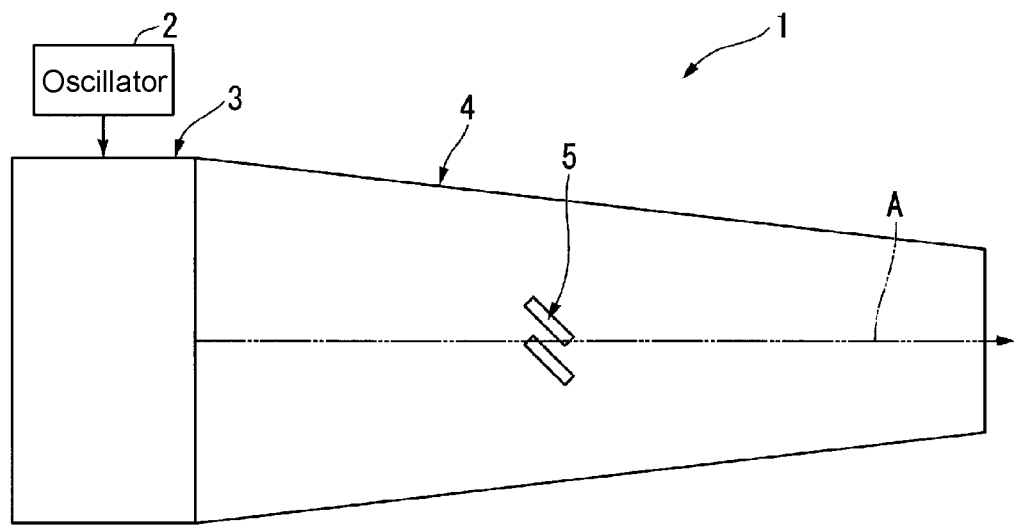
FIG. 1 is a top view schematically showing an ultrasonic horn in one embodiment of the present invention.

FIG. 1 is a top view schematically showing an ultrasonic horn 1 in the embodiment.

The ultrasonic horn 1 is a device which vibrates based on a signal input from an oscillator 2. The ultrasonic horn 1 includes, as shown in FIG. 1, a vibrator (vibration generating unit) 3, a vibration amplifying unit 4, and a longitudinal-torsional vibration conversion slit unit 5. The oscillator 2 is configured to input the signal of a driving frequency of the vibrator 3 into the vibrator 3. On the basis of the signal having a frequency in the ultrasonic band input from the oscillator 2, the vibrator 3 can excite, for example, 40 kHz ultrasonic longitudinal vibration and is connected to a vibration amplifying unit 4. A longitudinal-torsional vibration conversion slit unit 5 is constituted by a plurality of slits formed in a groove-like shape on the surface of the vibration amplifying unit 4. The oscillator 2 and the vibrator 3 cause the ultrasonic horn 1 to generate longitudinal vibration having a single frequency. Furthermore, a range of the driving frequency generated from the oscillator 2 is, for example, the ultrasonic band from 10 kHz to 200 kHz.

Figure 2:
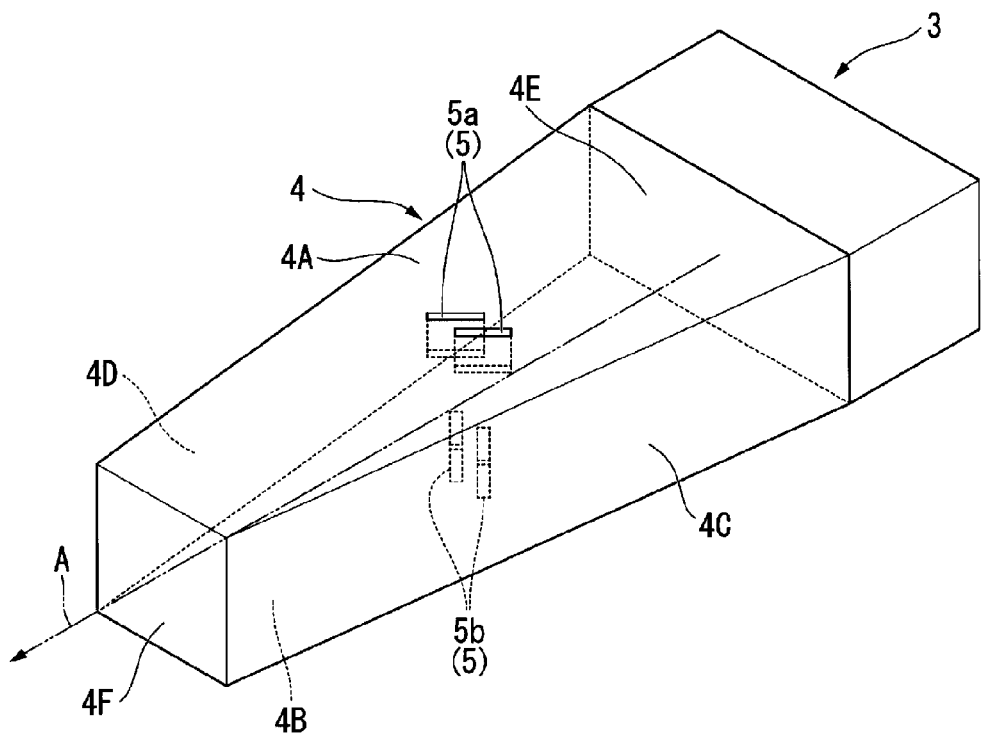
FIG. 2 is a perspective view including a vibration amplifying unit and a longitudinal-torsional vibration conversion slit unit in one embodiment of the present invention.

FIG. 2 is a perspective view including the vibration amplifying unit 4 and the longitudinal-torsional vibration conversion slit unit 5 in the embodiment.

As shown in FIG. 2, in a top view, the vibration amplifying unit 4 has a quadrangular prism shape which has a top surface 4A and a bottom surface 4B in an isosceles trapezium shape and a solid cross-section surface. The top surface 4A is a surface opposite to the bottom surface 4B. On the top surface 4A and the bottom surface 4B, two upper slits 5a and two lower slits 5b which constitute the longitudinal-torsional vibration conversion slit unit 5 are formed. Besides, the vibration amplifying unit 4 has a side surface 4C, a side surface 4D, an end surface 4E, and an end surface 4F which are surfaces not provided with the longitudinal-torsional vibration conversion slit unit 5.

The side surface 4C and the side surface 4D are opposite to each other; when the ultrasonic horn 1 is used as an ultrasonic processing machine, a gripper can be arranged in a position of the longitudinal vibration node in the side surface 4C and the side surface 4D. The end surface 4E and the end surface 4F are located in parallel, and have a rectangular shape in a plane view. The end surface 4 contacts the vibrator 3. Besides, the end surface 4F is set with an area smaller than the area of the end surface 4E. Furthermore, a head for processing can be mounted on the end surface 4F. That is, the vibration amplifying unit 4 is formed in a taper shape which is tapered toward the end surface 4F in the transmitting direction of the longitudinal vibration. The vibration amplifying unit 4 is configured to amplify amplitude of the longitudinal vibration transmitted from the vibrator 3.

As shown in FIG. 2, the longitudinal-torsional vibration conversion slit unit 5 has two upper slits 5a formed on the top surface 4A and two lower slits 5b formed on the bottom surface 4B. Such a longitudinal-torsional vibration conversion slit unit 5 is set so as to make all the slits same in depth and width. Furthermore, the upper slits 5a and the lower slits 5b do not pass through the vibration amplifying unit 4. And the maximum depth of all the upper slits 5a and the lower slits 5b is less than ½ of the vertical thickness of the vibration amplifying unit 4. Besides, the longitudinal-torsional vibration conversion slit unit 5 is desirably arranged in a position of the longitudinal vibration node in the vibration amplifying unit 4.

Besides, the upper slits 5a are formed so that the two upper slits 5a lay side-by-side in parallel, and are formed obliquely for 45° relative to the transmitting direction of the longitudinal vibration (the direction of arrow A shown in FIG. 1 and FIG. 2). The lower slits 5b are formed so that the two lower slits 5b lay side-by-side in parallel, and are formed obliquely for 45° relative to the transmitting direction of the longitudinal vibration in an opposite direction of the inclination of the upper slits 5a. That is, the upper slits 5a and the lower slits 5b are arranged, observed from the top surface 4A side, line-symmetrically to a line parallel to the transmitting direction of the longitudinal vibration which passes through a center of the end surface 4E. Provided with such a structure, the longitudinal-torsional vibration conversion slit unit 5 converts the longitudinal vibration transmitted from the vibrator 3 into the torsional vibration. Furthermore, the upper slits 5a and the lower slits 5b are desirably formed obliquely in a range from 10° to 80° relative to the transmitting direction of the longitudinal vibration.

By having the above mentioned structure, the ultrasonic horn 1 can generate the ultrasonic longitudinal vibration which is generated by the vibrator 3, and the ultrasonic torsional vibration which is generated by the longitudinal-torsional vibration conversion slit unit 5 at the same time.

Figure 3A:
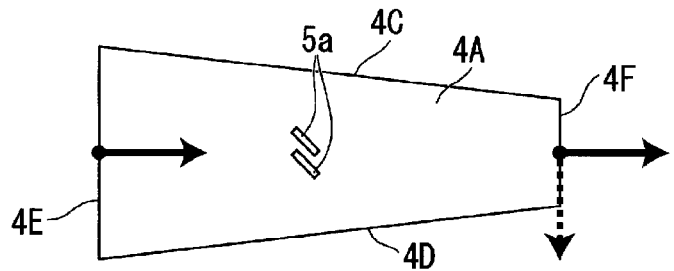
FIG. 3A is a top view of the ultrasonic horn in one embodiment of the present invention and shows an instantaneous vibration direction.
Figure 3B:
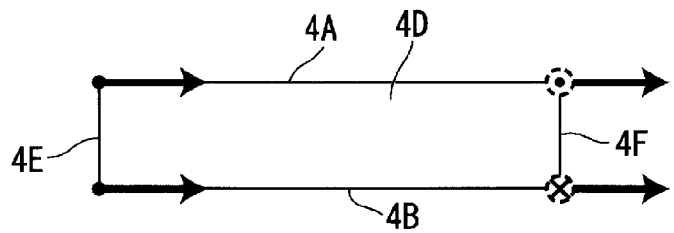
FIG. 3B is a side view of the ultrasonic horn in one embodiment of the present invention and shows an instantaneous vibration direction.
Figure 3C:
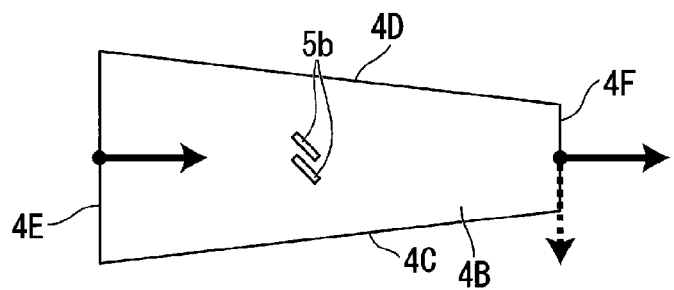
FIG. 3C is a bottom view of the ultrasonic horn in one embodiment of the present invention and shows an instantaneous vibration direction.
Figure 3D:
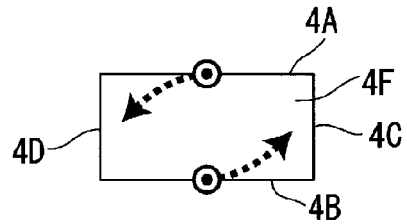
FIG. 3D is a side view in a transmitting direction of the longitudinal vibration of the ultrasonic horn in one embodiment of the present invention, and shows an instantaneous vibration direction.

Next, an operation of the ultrasonic horn 1 in the embodiment is described. FIG. 3A to FIG. 3D are drawings showing an instantaneous vibration direction of the vibration amplifying unit 4 in the embodiment. FIG. 3A is a top view of the vibration amplifying unit 4, FIG. 3B is a side view of the vibration amplifying unit 4, FIG. 3C is a bottom view of the vibration amplifying unit 4, and FIG. 3D is an end view of the vibration amplifying unit 4 in the longitudinal vibration transmitting direction. Furthermore, solid arrows in FIG. 3A to FIG. 3D represent the longitudinal vibration, and dotted arrows in FIG. 3A to FIG. 3D represent the torsional vibration.

When the ultrasonic horn 1 is driven, a signal is input to the vibrator 3 from the oscillator 2, and the ultrasonic longitudinal vibration of the vibrator 3 is excited. As shown in FIG. 3A to FIG. 3D, in the vibration amplifying unit 4, the longitudinal vibration is transmitted from the end surface 4E side which contacts the vibrator 3. The longitudinal vibration which is transmitted to the vibration amplifying unit 4 changes the transmitting direction by passing through the longitudinal-torsional vibration conversion slit unit 5.

In this case, the transmitting direction of the longitudinal vibration which reaches the upper slits 5a on the longitudinal-torsional top surface 4A side is inflected towards the side surface 4D by the upper slits 5a, so that the longitudinal vibration is converted to flexural vibration. Besides, the longitudinal vibration which reaches the lower slits 5b on the bottom surface 4B side is inflected towards the side surface 4C by the lower slits 5b, and is converted to the flexural vibration.

Accordingly, as shown in FIG. 3A to FIG. 3D, the flexural vibration which passes through the upper slits 5a and the flexural vibration which passes through the lower slits 5b are transmitted toward directions opposite to each other. Therefore, the vibration amplifying unit 4 generates the torsional vibration which twists using the longitudinal vibration transmitting direction as an axis. That is, the longitudinal vibration passes through the upper slits 5a and the lower slits 5b so that the torsional vibration is generated in the end surface 4F. Besides, the longitudinal vibration which does not pass through the longitudinal vibration upper slits 5a and the lower slits 5b remains as longitudinal vibration in the end surface 4F. The vibration is converted into the longitudinal-torsional vibration by being propagated to the entire ultrasonic horn 1. Accordingly, in the vibration amplifying unit 4, both the longitudinal vibration and the torsional vibration are generated. Furthermore, arrows shown in FIG. 3A to FIG. 3D show an instantaneous vibration direction, and directions of the longitudinal vibration and the torsional vibration reverse constantly.

In the ultrasonic horn 1 in the embodiment, the upper slits 5a are formed on the top surface 4A of the vibration amplifying unit 4 and the lower slits 5b are formed on the bottom surface 4B. On the other hand, the slits are not formed on the side surface 4C and the side surface 4D. Accordingly, by the upper slits 5a and the lower slits 5b provided on two surfaces, the longitudinal vibration can be converted to the torsional vibration. Besides, on the side surface 4C and the side surface 4D which are not provided with the slits, the head for processing can be fixed.

Besides, the longitudinal-torsional vibration conversion slit unit 5 is formed on the vibration amplifying unit 4 so that it is unnecessary to arrange a rod. Accordingly, the ultrasonic horn 1 in the embodiment can simplify the structure. Accordingly, the ultrasonic horn 1 can more effectively transmit vibration.

Besides, according to the ultrasonic horn 1 in the embodiment, the vibration amplifying unit 4 has a rectangular shape in a plane view in the longitudinal vibration transmitting direction. Therefore, a special tool for processing is unnecessary when the longitudinal-torsional vibration conversion slit unit 5 is formed.

Besides, according to the ultrasonic horn 1 in the embodiment, the slits 5a, 5b of the longitudinal-torsional vibration conversion slit unit 5 are provided on the top surface 4A and the bottom surface 4B opposite to the top surface 4A. Accordingly, the flexural vibration on the top surface 4A side and the flexural component on the bottom surface 4B side are equal in strength. Therefore, the torsional vibration can be generated stably.

Furthermore, the slits 5a, 5b of the longitudinal-torsional vibration conversion slit unit 5 in the embodiment are formed obliquely for 45° relative to the longitudinal vibration transmitting direction. Accordingly, the longitudinal vibration which reaches the upper slits 5a and the lower slits 5b is vertically inflected to the flexural vibration, and thus strength of the flexural vibration component is great. Therefore, the longitudinal-torsional vibration conversion slit unit 5 can more effectively convert the longitudinal vibration into the torsional vibration.

Besides, on the side surface 4C and the side surface 4D which are surfaces not provided with the slits 5a, 5b, the gripper can be arranged and the head for processing can be fixed. The side surface 4C and the side surface 4D are arranged in opposite positions, so that the side surface 4C and the side surface 4D can stably support the head for processing by fixing the head for processing on two surfaces.

Besides, according to the ultrasonic horn 1 in the embodiment, the oscillator 2 and the vibrator 3 generate the longitudinal vibration having a single frequency. That is, the ultrasonic horn 1 can generate longitudinal vibration and torsional vibration by the longitudinal vibration having a single frequency. Therefore, it is unnecessary to arrange the oscillator 2 and the vibrator 3 for every vibration type, and the structure of the ultrasonic 1 can be simplified.

Furthermore, the present invention is not limited to the above embodiment, for example, the following variation is considered.

(1) In the above embodiment, the longitudinal-torsional vibration conversion slit unit 5 is constituted by the slits 5a, 5b which are formed on the top surface 4A and the bottom surface 4B, but the present invention is not limited thereto.

Figure 4A:
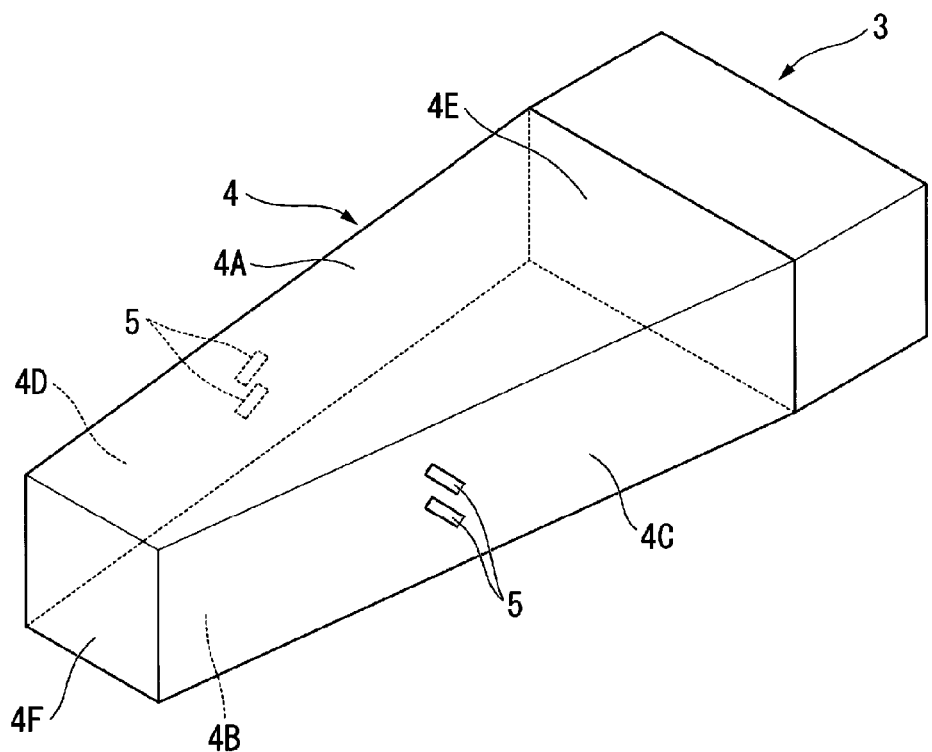
FIG. 4A is a drawing showing a variation of the vibration amplifying unit in one embodiment of the present invention and is a perspective view.
Figure 4B:
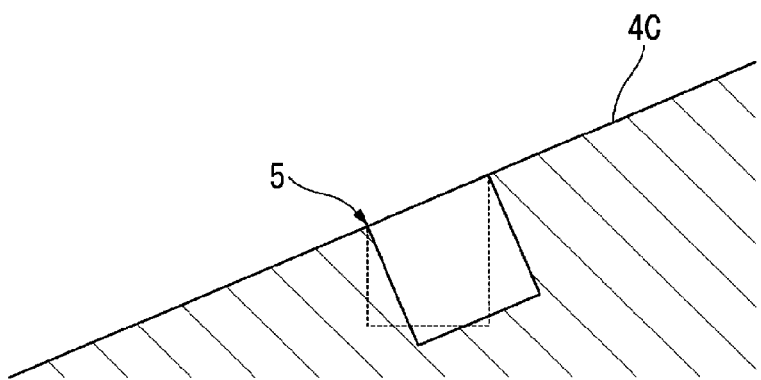
FIG. 4B is a drawing showing an variation of the vibration amplifying unit in one embodiment of the present invention, and is a cross-section view in a position which is provided with the longitudinal-torsional vibration conversion slit unit.

FIG. 4A and FIG. 4B are drawings showing a variation of the vibration amplifying unit 4 in the embodiment; FIG. 4A is a perspective view, and FIG. 4B is a cross-section view in a position which is provided with the longitudinal-torsional vibration conversion slit unit 5. As shown in FIG. 4A, the slits which constitute the longitudinal-torsional vibration conversion slit unit 5 may be arranged on the side surface 4C and the side surface 4D.

Furthermore, when the slits are formed on the side surface 4C and the side surface 4D, the slits are considered to be formed, as shown by the solid line in FIG. 4B, toward a vertical direction relative to the side surface 4C and the side surface 4D, or the slits are considered to be formed, as shown by the dotted line in FIG. 4B, vertically relative to the transmitting direction of the longitudinal vibration.

(2) Besides, in the above embodiment, the vibration amplifying unit 4 is in a quadrangular prism shape, and the end surface 4E and the end surface 4F are in a rectangular shape, but the present invention is not limited thereto. The end surface 4E and the end surface 4F may also be a polygon such as a triangle, a pentagon and so on.

(3) Besides, in the above embodiment, the slits which constitute the longitudinal-torsional vibration conversion slit unit 5 are formed on two surfaces which are the side surface 4C and the side surface 4D, but the present invention is not limited thereto. When the end surface 4E and the end surface 4F are in a polygonal shape which has more than four angles, as long as surfaces besides the end surface 4E and the end surface 4F which are not provided with the slits are included, the longitudinal-torsional vibration conversion slit unit 5 may be constituted by the slits which are form on more than two surfaces.

(4) Besides, in the above embodiment, the slits which constitute the longitudinal-torsional vibration conversion slit unit 5 are formed obliquely for 45° relative to the transmitting direction of the longitudinal vibration, but the present invention is not limited thereto.

The slits which constitute the longitudinal-torsional vibration conversion slit unit 5 may be formed obliquely for, for example, 30° relative to the transmitting direction of the longitudinal vibration. In this case, the upper slits 5a are formed to incline clockwise for 30° with respect to the longitudinal vibration transmitting direction (the arrow A shown in FIG. 2), and the lower slits 5b are formed to incline anticlockwise for 30° relative to the longitudinal vibration transmitting direction (the arrow A shown in FIG. 2). Accordingly, strength of the flexural vibration is in the same degree so that stable torsional vibration is obtained.

(5) Besides, in the above embodiment, on the surfaces which are not provided with the slits (the side surface 4C and the side surface 4D), the gripper can be arranged and the head for processing can be mounted, but the present invention is not limited thereto. On the surfaces which are provided with the slits (the top surface 4A and the bottom surface 4B), the gripper can also be arranged and the head for processing can also be mounted in a position which does not contact the slits.

(6) Besides, in the above embodiment, with respect to one surface of the vibration amplifying unit 4, two upper slits 5a and two lower slits 5b are respectively arranged on the top surface 4A and the bottom surface 4B, but the present invention is not limited thereto. The upper slit 5a and the lower slit 5b may also be one for each, or be more than three for each. (7) Besides, in the longitudinal-torsional vibration convert slit unit 5 in the above embodiment, all the slits are the same in depth and width, but the present invention is not limited thereto. The Depth, width and shape of the slits can change according to the shape and the like of the vibration amplifying unit 4.

(8) Besides, in the above embodiment, only one oscillator 2 is arranged, but the present invention is not limited thereto. A plurality of oscillators 2 may be arranged to apply a plurality of frequencies to the vibrator 3. Furthermore, when a plurality of oscillators 2 are arranged, an adder or a multiplier may be arranged between the oscillator 2 and the vibrator 3.

INDUSTRIAL APPLICABILITY

The present invention is suitable as an ultrasonic horn used in a wire bonding device. Furthermore, the present invention can also be applied to a device, such as a welding device, which provides ultrasonic vibration to an object.

What is claimed is:

1. An ultrasonic horn, comprising:
a vibrator configured to generate longitudinal vibration having a frequency in the ultrasonic band on the basis of a signal having a frequency in the ultrasonic band input from an oscillator;
a vibration amplifying unit configured to amplify the longitudinal vibration while transmitting the longitudinal vibration from the vibrator,
wherein the vibration amplifying unit has a plurality of surfaces and a rectangular shape in a side view; and
a longitudinal-torsional vibration conversion slit unit configured to convert the longitudinal vibration into torsional vibration, wherein the longitudinal-torsional vibration conversion slit unit has slits formed in a groove-like shape on two of the plurality of surfaces opposite to each other,
wherein the slits are formed obliquely relative to a transmitting direction of the longitudinal vibration, and inclined directions of the slits respectively formed on the two of the plurality of surfaces relative to the transmitting direction of the longitudinal vibration are opposite to each other,
wherein the vibration amplifying unit has another two of the plurality of surfaces opposite to each other not provided with the slits,
wherein the another two of the plurality of surfaces not provided with the slits are respectively connected with the vibrator and inclined relative to the transmitting direction of the longitudinal vibration constantly throughout a whole range from the vibrator to an end surface of the vibration amplifying unit away from the vibrator.

2. The ultrasonic horn according to claim 1, wherein the vibrator generates the longitudinal vibration having a single frequency.

\* \* \* \* \*